United States Patent
Wang et al.

(10) Patent No.: US 11,217,010 B2
(45) Date of Patent: Jan. 4, 2022

(54) SKETCH-BASED SHAPE-PRESERVING TREE ANIMATION METHOD

(71) Applicant: ZHEJIANG UNIVERSITY, Hangzhou (CN)

(72) Inventors: Yutong Wang, Hangzhou (CN); Luyuan Wang, Hangzhou (CN); Xiaogang Jin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/618,752

(22) PCT Filed: Jun. 14, 2018

(86) PCT No.: PCT/CN2018/091223
§ 371 (c)(1),
(2) Date: Dec. 2, 2019

(87) PCT Pub. No.: WO2019/200683
PCT Pub. Date: Oct. 24, 2019

(65) Prior Publication Data
US 2020/0160596 A1 May 21, 2020

(30) Foreign Application Priority Data

Apr. 19, 2018 (CN) .......................... 201810351876.9

(51) Int. Cl.
*G06T 17/00* (2006.01)
*G06T 13/20* (2011.01)
*G06T 17/20* (2006.01)

(52) U.S. Cl.
CPC ............ *G06T 17/005* (2013.01); *G06T 13/20* (2013.01); *G06T 17/20* (2013.01)

(58) Field of Classification Search
CPC ....... G06T 17/005; G06T 13/20; G06T 17/20; G06T 17/00; G06T 13/60
See application file for complete search history.

(56) References Cited

PUBLICATIONS

Wang Y, Wang L, Deng Z, Jin X. Topologically consistent leafy tree morphing. Comput Animat and Virtual Worlds. 2017; 28(3-4). pp. 1-10 (Year: 2017).*

(Continued)

*Primary Examiner* — Jennifer Mehmood
*Assistant Examiner* — Andrew Shin
(74) *Attorney, Agent, or Firm* — Jiwen Chen; Jacobson Holman PLLC

(57) ABSTRACT

The present invention discloses a sketch-based shape maintaining tree transformation animation method, comprising: creating a three-dimensional tree model; representing the three-dimensional tree model in the form of a skeleton and a cluster of leaves; selecting an angle of interest, detecting the step (2) canopy silhouette of the 3D tree model, and the transformation animation target canopy silhouette is drawn on the sketch, and the crown silhouette of the 3D tree model is gradually transformed into a transformation animation target crown silhouette, and the crown of the 3D tree model is the transformation of the silhouette is transmitted to the branches to obtain a smooth transformation process of the trees; the transformation process of the crown silhouette and the branches is recorded frame by frame, and the tree transformation animation of the shape is obtained. The invention maintains tree topological consistency and canopy morphological significance, and also provides an intuitive three-dimensional tree editing operation, which can effectively edit a three-dimensional tree model by simply drawing a simple sketch.

11 Claims, 4 Drawing Sheets

(56) References Cited

PUBLICATIONS

Chen X, Neubert B, Xu YQ, Deussen O, Kang SB. Sketch-based tree modeling using Markov random field. ACM Trans Graph. 2008; 27(5). pp. 1-9 (Year: 2008).*

* cited by examiner

SKETCH-BASED SHAPE-PRESERVING TREE ANIMATION METHOD

This is a U.S. national stage application of PCT Application No. PCT/CN2018/091223 under 35 U.S.C. 371, filed Jun. 14, 2018 in Chinese, claiming priority of Chinese Application No. 20180351876.9, filed Apr. 19, 2018, all of which is hereby incorporated by reference.

TECHNOLOGY FIELD

The present invention is related to computer graphics, three-dimensional (3D) tree modeling and computer animation, and particularly related to a sketch-based shape-preserving tree animation method.

BACKGROUND TECHNOLOGY

Trees are the one of the most ubiquitous natural objects in both reality and the virtual worlds. Recently, with the rapid development and popularization of digital techniques, computer synthesized 3D trees have been widely used in the film and entertainment, 3D animation industry, and virtual reality.

The study of 3D tree modeling dates back to the 1960s. Despite the long history, it has remained to be an active research field and continuously gained attentions from the computer scientists and botanists. A large number of works have been proposed, and they have achieved the goal of generating photo-realistic 3D tree models. According to different modeling purposes, these methods can be roughly classified into two categories: static tree modeling methods and animated tree modeling method. Specifically, static tree modeling methods mainly focus on generating visually realistic 3D tree geometries, whereas animated tree modeling methods target on generating pleasing visual effects, including tree growth animations and tree interactions with the environmental factors, such as sunlight, obstacles, wind, rain, fire, etc. In addition, in the film and computer animation industry, the requirement of stylizing tree animations arises in order to boost up the mysterious atmosphere of virtual scenes. One of the typical cases is that in 2010 Disney movie Tangled, a white horse conceals its head behind a tree, and the tree branches smoothly transformed into a horse-head shape. Therefore, stylized tree animations are one of the promising research topics of the tree animation field.

To generate a shape-preserving tree animation, we are facing two technical challenges, and they are: (1) how to preserve the topological consistencies of tree branches during the animation, e.g. the branches are not broken or floating; (2) how to transform the branches while retaining the topological hierarchy to form a morphologically significant crown.

Generally speaking, the shape-preserving tree animation is closely related to three research areas, and they are the shape-guided 3D tree modeling, the traditional 3D tree animations, and the topology-aware tree morphing proposed in recent years.

To date, computer scientists have proposed various shape-guided 3D modeling methods by focusing on generating visually realistic 3D tree models with specialized shapes. Here, we list three representative classic methods, and they are the pruning L-system, the spatial colonization algorithm and the variational inverse tree modeling method. However, the majority of them only generate static trees and are sensitive to the change of the guidance shapes. In other words, when the shape of the guide changes, these algorithms need to be rerun to generate a three-dimensional tree model that conforms to the new guide shape. Since this method requires regenerating a new tree model for each frame of the animation and does not guarantee topologically consistent tree branches, they are not suitable for generating shape-preserving tree animations.

Existing literature on tree animations can be roughly classified into two categories: animating trees' development and their interactions with environment. For tree growth animation, there are algorithms in the prior art that create a growth animation of a botanical tree by interpolating a number of predefined developmental parameters. However, none of them is capable of generating shape-preserving animations of smoothly transforming leafy trees into custom shapes, and none of them guarantees the consistency of the crown shape and the continuity of the branch topology. The main reason is that these developmental parameters have no direct association with on trees' crown shapes, and interpolating them cannot guarantee to generate morphologically continuous and meaningful in-between crowns. In addition to growth animations, various efforts have been conducted to deform and prune branches of a tree in order to generate realistic responses to environmental factors, such as Zhao and Barbič (*Yili Zhao and Jernej Barbič. Interactive authoring of simulation-ready plants. ACM Transactions on Graphics (TOG)*, 32(4):84, 2013), which animated effects of visually beautiful trees waving in the wind; and Pirk et al. (*Sören Pirk, Ondrej Stava, Julian Kratt, Michel Abdul Massih Said, Boris Neubert, Randomir Mech, Bedrich Benes, and Oliver Deussen. Plastic trees: interactive self-adapting botanical tree models[J]. ACMTransactions on Graphics (TOG)*, 31(4):50, 2012), which realistically simulates the interaction of trees with the environment under the influence of light and obstacles etc. Despite that the shape of the tree is changed according to the environment, it cannot be smoothly transformed into a user-defined shape since existing methods do not put explicit efforts on preserving the morphological meanings of trees' crown shapes.

Recently, Wang et al. proposed methods to create topologically consistent animations between two topologically varying trees. (see *Yutong Wang, Xiaowei Xue, Xiaogang Jin, and Zhigang Deng. Creative virtual tree modeling through hierarchical topology-preserving blending. IEEE Transactions on Visualization and Computer Graphics*, 23(12):2521-2534, 2017) and (*Yutong Wang, Luyuan Wang, Zhigang Deng, and Xiaogang Jin. Topologically consistent leafy tree morphing. Computer Animation and Virtual Worlds*, 28(3-4), 2017). However, these algorithms do not preserve the morphological significance of the changing crown, resulting in undesirable visual effects when deformed between trees with a particular canopy shape. In addition, these methods strictly require the input of two trees as the source and target models of the transformation animation.

SUMMARY OF THE INVENTION

The present invention presents a sketch-based shape-preserving tree animation method, capable of smoothly transforming leafy trees into trees having morphologically specified crown shape as specified on the sketch.

A tree transformation animation method based on a sketch to achieve shape retention, comprising the following steps:
(1) creating a three-dimensional tree model;
(2) representing the three-dimensional tree model in a form of a skeleton and a cluster of leaves, which is achieved in the following substeps:

(2.1) separating the leaves and trunks of a three-dimensional tree model, including the trunk portion and the branch portion of the tree;

(2.2) extracting the skeleton of the tree branches of the three-dimensional tree model;

(2.3) determining the crown portion of the three-dimensional tree model based on human visual perception of the trunk structure and the overall shape of the canopy, splitting the crown into several outer contours composed of leaves, represented by clusters of leaves, and using the mean coordinates to indicate the relative positional relationship between the silhouette of the inner leaf cluster and the contour of the outer leaf cluster;

According to the tree-parent-child relationship of trees, the leaf clusters also obey the strict parent-child hierarchical relationship, so the hierarchical relationship between different leaf clusters can be described as a multi-scale leaf cluster topology tree.

Considering the parent-child hierarchical relationship between the canopy and the leaf cluster and the nature of the inner leaf clusters wrapped by the outer leaf clusters, the outer leaf cluster is regarded as the surrounding mesh of the inner leaf cluster. Therefore, at a selected viewing angle, the silhouette of the outer leaf cluster can also be regarded as the surrounding polygon of the inner leaf cluster silhouette. By using this property, the relative positional relationship between the inner leaf cluster silhouette and the outer leaf cluster silhouette can be represented by mean coordinates.

(3) selecting an angle of interest, detecting the crown silhouette of the three-dimensional tree model described in step (2), drawing a silhouette of the deformed animation target crown silhouette based on the sketch, and then mapping the sketch to the crown silhouette line of the object space;

(4) gradually transforming the crown silhouette of the 3D tree model into the contour of the crown of the transformation animation target, and transmitting the transformed crown silhouette of the 3D tree model to the branches to obtain a smooth transformation process of the tree; and (5) recording frame by frame of the tree transformation process in the step (4) to obtain a shape transformation tree transformation animation.

Preferably, the 3D trees in step (1) can be generated by any of the following methods: the 3D tree model is reconstructed based on point cloud data of real trees, and the resulting 3D tree model is more realistic 3D tree. The computer synthesized virtual trees may also be generated based on the L-system, or the 3D trees hand modeled by users using 3D modeling tools, such as Maya and 3Ds Max, etc. The above method has strong flexibility and expandability, and can generate shape-preserving transformation animations for different kinds of trees (including trees and shrubs) with different topologies.

Preferably, the line skeletons of the tree branches of the 3D tree model in step (2.2) are extracted by the Laplacian mesh contraction method, wherein contraction means moving the model vertices of a three-dimensional tree trunk in the opposite direction of its normal line. Due to the cylindrical nature of the tree branches, the cross-sectional vertices will eventually converge to one point, that is, the skeletal node. The skeleton points are connected according to the topological structure of the trunk to obtain the skeleton of the trunk. The average of the distance from all the vertices on the cross section of the trunk model before contraction to the skeleton point is taken as the radius of the skeleton point, thereby simplifying the three-dimensional trunk model into a skeleton+radius description.

More preferably, the skeleton extracted by the Laplacian mesh contraction algorithm in step (2.2) is restored to a three-dimensional model of the trunk using a sphere sweeping techniques.

Preferably, in step (3), the object space silhouette of the crown of the three-dimensional tree model is detected, and the object space silhouette is formed by a series of edges on the three-dimensional tree model, and the vertex normal vectors $n_i$ and $n_j$ and the sight direction v of the sides satisfy the following relationship $$(n_i \cdot v) * (n_j \cdot v) = 0.$$

where $n_i$ and $n_j$ are the vertex normals of the edge's two endpoints, and v is the view direction.

The advantage of object-space silhouette lies in its accuracy, which facilitates direct manipulation and control of the 3D model.

As a further preference, in the step (3), the deformed animated target canopy silhouette is drawn, the region of interest on the crown silhouette line is redrawn, and the shape of the existing canopy is slightly modified as a sketch, and local transformation can be realized without affecting the whole.

In step (3), a new sketch can also be redrawn as the silhouette outline of the target axis of the transformation animation.

As a preference, the transformation of the crown is transmitted to the trunk through the multi-scale leaf cluster topology and the Laplace transformation algorithm as in step (4), which is achieved by following substeps:

(4.1) regarding the outer leaf cluster as the surrounding grid of the inner leaf cluster, and the multi-scale leaf cluster topology tree is established.

(4.2) updating the silhouette of the inner leaf cluster according to the mean-value coordinate of the inner leaf cluster silhouette line relative to the outer leaf cluster silhouette line, and continuously updating the silhouette of the inner leaf cluster according to the multi-scale leaf cluster topology tree;

(4.3) transforming the three-dimensional model of the leaf cluster and transmitting to the branches according to the deformed leaf cluster silhouette.

As a further preference, step (4.1) establishes a multi-scale leaf cluster topology tree and then prunes the branches outside the contour outline of the transformation animation target crown.

As a still further preference, the step (4.1) is specified as follows: using a Vatti polygon clipping algorithm to intersect the contour of the deformed target crown silhouette and the original crown silhouette, and calculating the ratio of the intersection area to the area of the original crown silhouette area, denoted as r. Based on r, it is judged whether the leaf cluster is trimmed, and it is determined that the branches surrounded by the trimmed leaf clusters gradually disappear in the transformation animation, and a more natural transformation result is obtained.

As a further preference, step (4.2) is specified as follows: first, calculating the mean-value coordinate of the outline of the inner leaf cluster with respect to the outline of the outer leaf cluster silhouette. Subsequently, after the outer leaf cluster silhouette is deformed, the Cartesian coordinates of the inner leaf cluster silhouette vertex are updated by using the inner leaf cluster silhouette relative to the mean-value coordinate of the outer leaf cluster silhouette. Next, continuing to deform the inner leaf clusters using the following equation to cover the outer leaf cluster silhouette as much as possible:

$$\underset{v'_i}{\arg\min} \sum_{v'_i \in S} \|L(v'_i) - \delta_i\|^2 + \sum_{v_j \in C} \|v'_j - v_j\|^2,$$

where S=(V, E) is the inner silhouette, where V is the set of vertices, E is the set of edges. $v_i$ and $v'_i$ are the Cartesian coordinates of the silhouette vertices on the outline of the leaf cluster before and after the transformation, respectively. $\delta_i$ is the differential coordinate of $v_i$, C is a set of constraint vertices that are locally matched to the silhouettes of the leaf cluster and the outer silhouette. $v_j$ and $v'_j$ are the vertices Cartesian coordinates of the silhouette of the inner layer of the leaf cluster before and after the transformation in the set C, respectively.

As a further preference, step (4.3) is specified as follows:

(4.3.1) computing the cotangent weight Laplacian operator of the leaf cluster in step (2), and establishing a differential coordinate equation, thereby transforming the vertex of the leaf cluster in the three-dimensional tree model from a Cartesian coordinate system to a differential coordinate space;

(4.3.2) the vertices on the silhouette line of the leaf cluster at the selected angle of view in step (3) are used as a set of constraint points, and a full rank linear equation system is established together with the new position of the vertices of the contour after transformation:

According to the three-dimensional tree model, a three-dimensional model of the leaf cluster is given, denoted as M=(V, E, F), where V is the set of vertices, E is the set of model edges, and F is the set of faces, then the system expression of the full rank linear equation is as follows:

$$\sum_{v'_i \in M} \|L(v'_i) - \delta_i\|^2 + \sum_{v_j \in C} \|v'_j - v_j\|^2$$

wherein $v_j$ and $v'_j$ are the Cartesian coordinates of the model vertices of the leaf cluster before and after the transformation, respectively. $\delta_i$ is the differential coordinate of $v_i$; C is the vertex set on the silhouette of the leaf cluster. $v_i$ and $v'_i$ are the Cartesian coordinates of the vertex of the silhouette of the leaf cluster silhouette before and after the transformation, respectively.

The three-dimensional model of the new leaf cluster conforming to the contour of the leaf cluster after transformation in the selected angle of view in step (3) is solved using least squares method.

(4.3.3) The innermost leaf cluster is regarded as the surrounding mesh at the end of the branch. Due to the transformation of the crown, the new position of the end of the branch after transformation is calculated by the mean-value coordinate of the end of the branch relative to the innermost leaf cluster;

(4.3.4) Computing the cotangent weight Laplacian operator of the branches in the 3D tree model, establishing the differential coordinate equation, and taking the root end of the branch as the fixed point, using the new position of the end of the branch obtained in step 4.3.3) as the moving constraint point, establishing a full rank linear equation system of step (4.3.2) to solve the transformed branches;

(4.3.5) Due to the hierarchical relationship between the branches, when the parent branches are transformed, the child branches will also undergo corresponding transformations, which is consistent with the process described in step (4.3.4).

The presented invention provides a novel sketch-based shape-preserving tree animation method, and has the following features:

(1) a novel tree transformation animation method, which allows interactive design and control of transformation animation effects, while preserving the tree topological consistency and canopy morphological significance;

(2) an intuitive 3D tree editing operation that allows designers to effectively edit the 3D tree model by simply drawing a sketch, transforming it into the crown shape depicted by the sketch, with clear steps, friendly interface and robust results, which can be used in computer animations, digital entertainment, 3D games, etc.

BRIEF DESCRIPTION OF THE DRAWINGS

FIG. 2(a) shows the creation of the 3D tree model; FIG. 2(b) is the skeleton-lobe representation of the 3D tree model; FIG. 2(c) illustrates the sketch-based crown editing operations; FIG. 2(d) is the generation of the shape-preserving tree animation.

FIG. 3(a) is the input 3D tree model, FIG. 3(b) is the skeleton-lobe representation of the 3D tree model, FIG. 3(c) is the multiscale description of the 3D tree model, FIG. 3 (d) is the hierarchical multiscale topology tree of the 3D tree model.

THE DETAILED DESCRIPTION OF THE EMBODIMENTS OF THE INVENTION

The following describes the presented invention in detail with reference to the accompanying figures.

Figure 1:
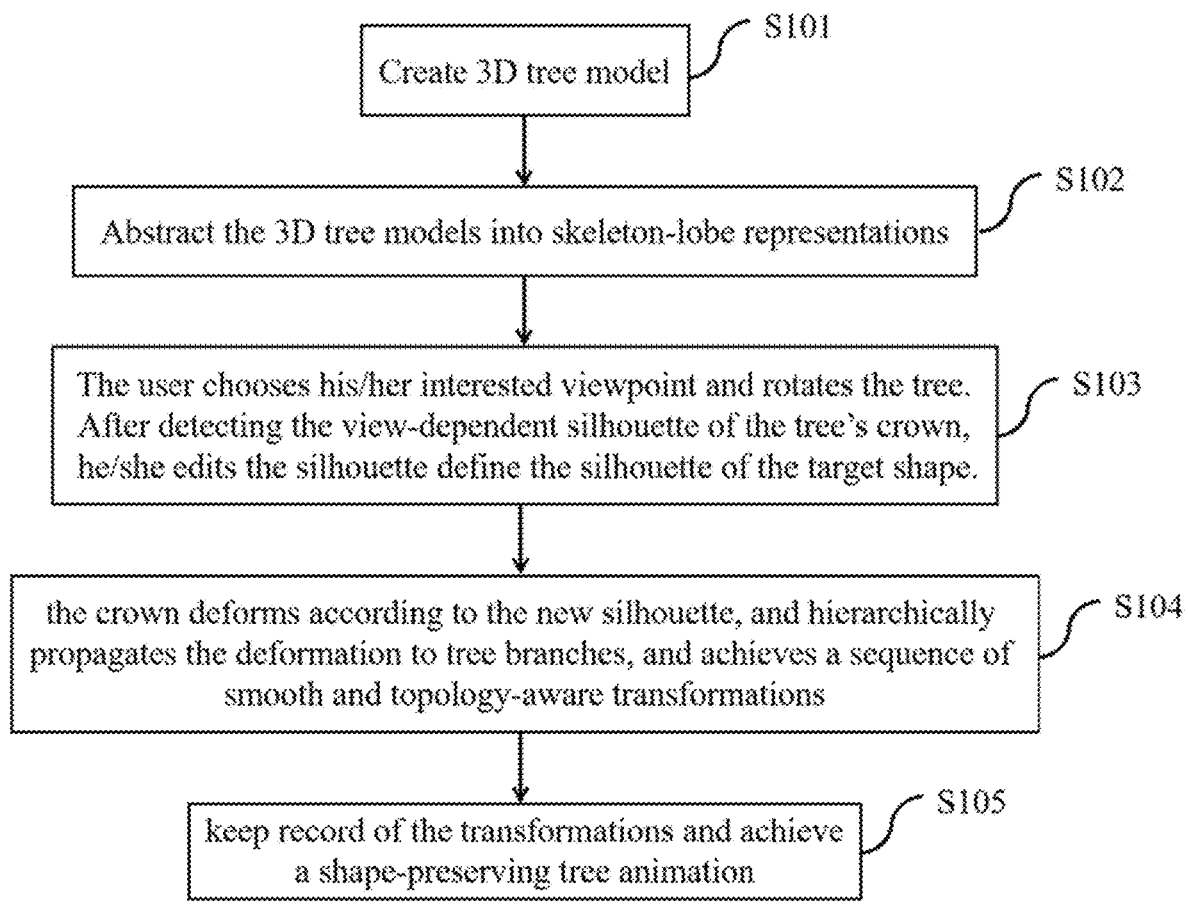
FIG. 1 is the overview of the sketch-based shape-preserving tree animation method.
Figure 2:
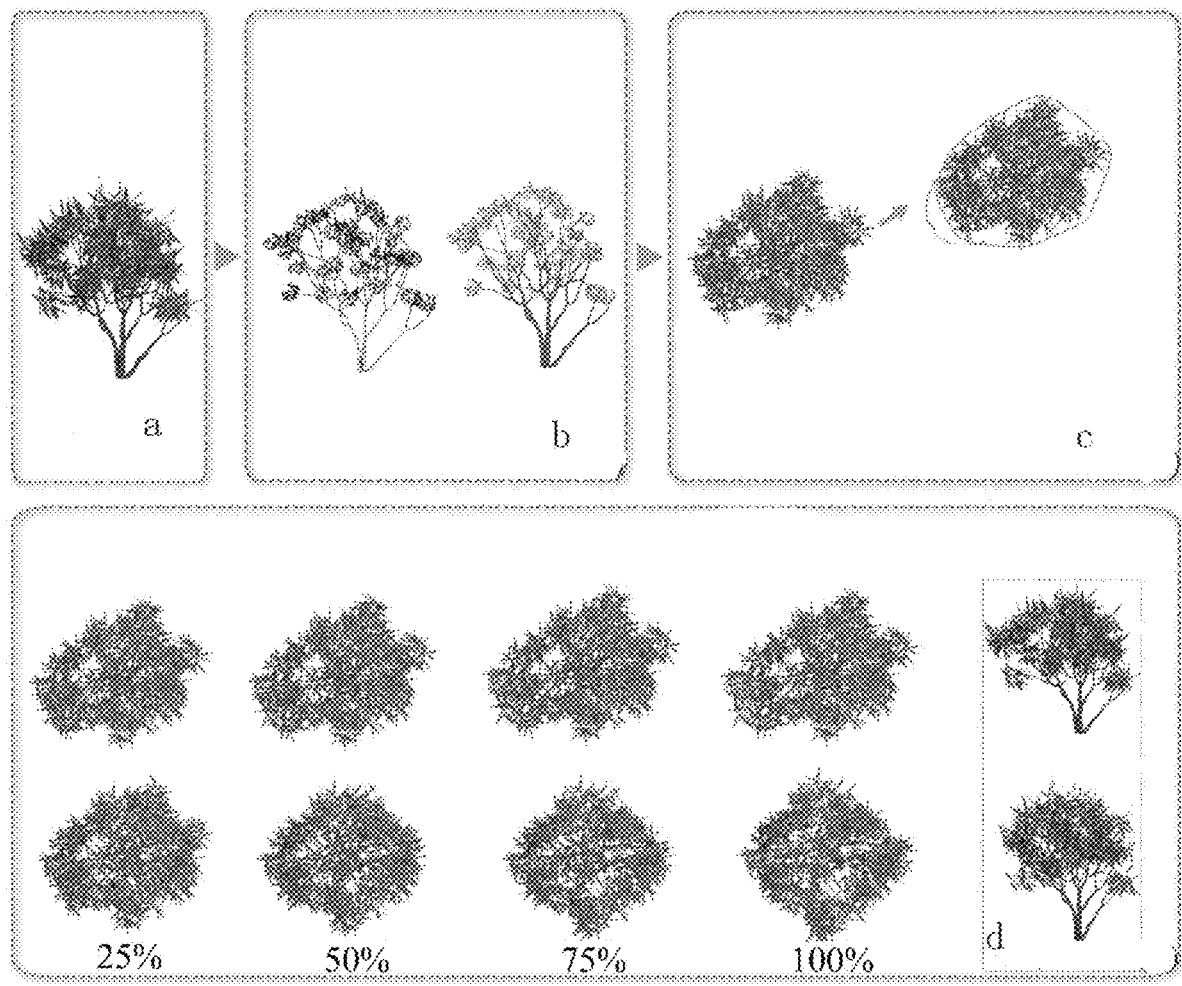
FIG. 2 is the illustration of the pipeline of the sketch-based shape-preserving tree animation method, where

As shown in FIG. 1, the sketch-based shape-preserving tree animation includes the following steps:

S101: creating 3D tree models, as shown in FIG. 2(a);

A point cloud and texture information of real-world three-dimensional trees are acquired by a hardware device such as a laser scanner to create a three-dimensional tree model.

S102: converting the 3D tree models into skeleton-lobe representation, as shown in FIG. 2(b), which is achieved by the following steps:

S1021: separating the leaves and trunks of the three-dimensional tree model of the step (1) by using a three-dimensional modeling software Maya, 3Ds Max, etc.

Figure 3:
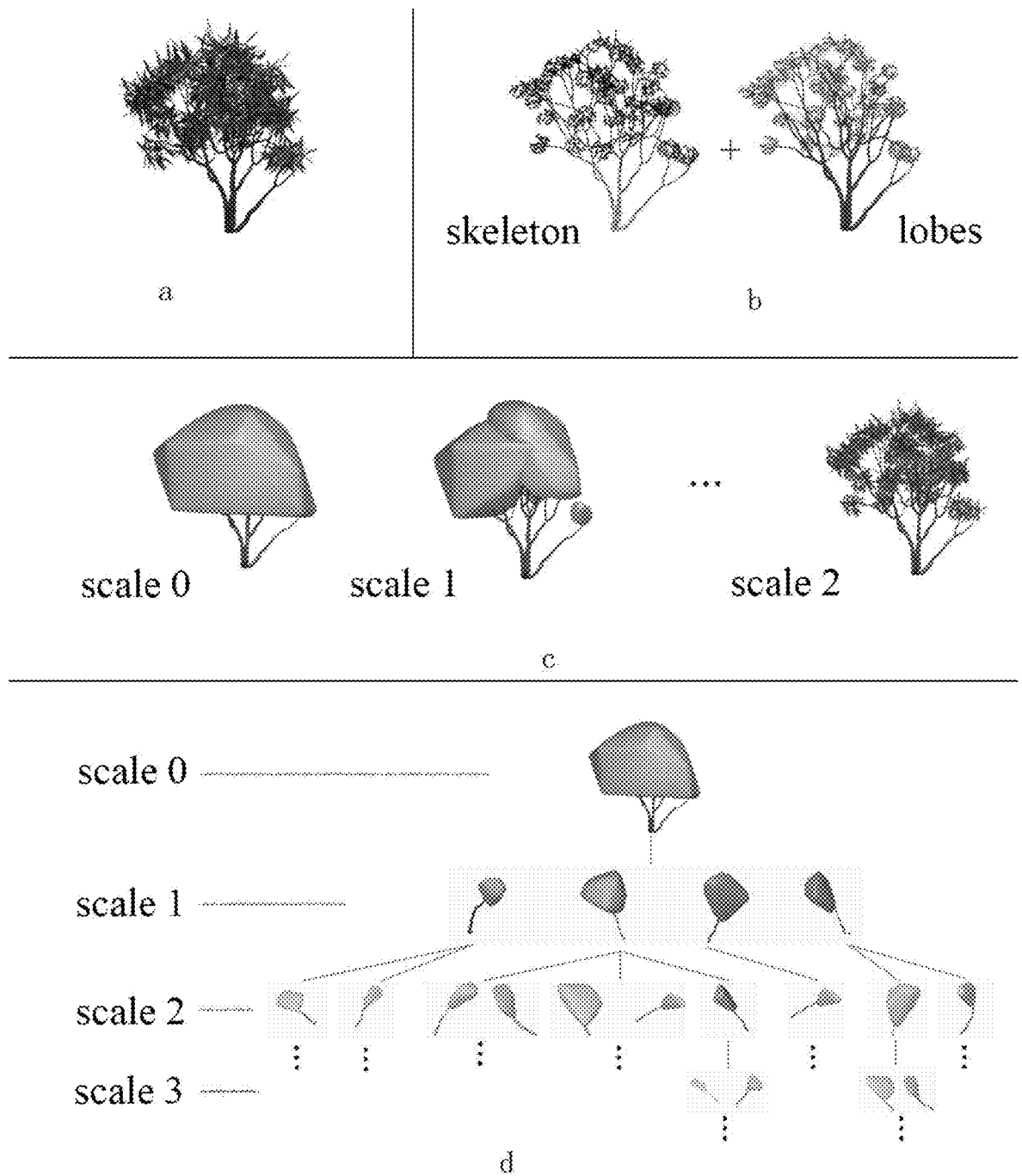
FIG. 3 is the illustration of the generation of the multiscale topology tree, where

S1022: for tree trunks of the 3D tree model, line skeletons are extracted by using the Laplacian mesh contraction method: The model vertices of the three-dimensional trunk are moved in the opposite direction of their normals, that is, contracted. Due to the nearly cylindrical nature of the tree branches, the cross-sectional vertices will eventually converge to one point, that is, the skeletal node or point. The skeleton points are connected according to the topological structure of the trunk to obtain the skeleton of the trunk. The average value of the distance from all the vertices on the cross section of the trunk model to the skeleton point is used as the radius of the skeleton point, thereby simplifying the three-dimensional trunk model into a skeleton+radius description;

S1023: based on the human's visual cognition of the trunk structure and the overall shape of the canopy, the canopy is split into outer contours composed of branches, i.e., clusters of leaves. Among them, the cluster of leaves composed of all the leaves is called the canopy of the three-dimensional tree model. Due to the inherent hierarchical relationship of trees, these clusters of leaves are strictly subject to such hierarchical relationships. Establishing a multi-scale leaf cluster topology tree to describe the hierarchical relationship between them, the steps are as follows:

S201: inputting a 3D tree model, as shown in FIG. 3(a);

S202: representing the 3D tree model with a skeleton and a cluster of leaves, as shown in FIG. 3(b);

S203: representing the 3D tree model with a multiscale leaf-cluster, as shown in FIG. 3(c);

S204: establishing a multi-scale leaf cluster topology tree, as shown in FIG. 3(d).

S103: selecting the angle of interest, detecting the crown silhouette of the three-dimensional tree model described in step (2), and drawing a contour map of the deformed animation target crown based on the sketch, as shown in FIG. 2c;

Detecting a canopy silhouette of the object space of the three-dimensional tree model described in the step (2), the crown silhouette is composed of a series of edges on the model, the vertex normal $n_i$ and $n_j$ of the edge's two endpoints, and the view direction v satisfying the following relationship:

$$(n_i \cdot v)*(n_j \cdot v)=0.$$

The Hertzmann's method is employed to detect the object-space silhouette. Specifically, for a closed 3D mesh model, each edge of the model has two adjacent triangular patches. Under one viewpoint, if one of the triangular patches is visible and the other triangular patch is not visible, it is satisfied. For the above formula, this edge is the edge of the model's silhouette line under the viewpoint. Traversing the entire model, collecting all the edges that satisfy the above formula, and connecting them with the depth-first algorithm to form the object space silhouette of the model.

Redrawing a portion of the silhouette line (i.e, the region of interest) and slightly modifying the shape of the existing canopy as a sketch.

After the sketch is finished, map the sketch from the screen space to the canopy silhouette line of the object space. The mapping process is established by parameterizing the arc length. The specific steps are as follows:

S1031: extracting the redrawn regions on the crown's silhouette, projecting them on the screen space, and then parameterizing the arc length, expressed as:

$$t_i = \frac{l_i}{l},$$

wherein $l_i$ is the length from the starting point of the silhouette to the vertex $v_i$, l is the total length of the silhouette, thereby completing the dispersion of the silhouette into the [0,1] space.

S1032: parameterizing the arc length of the redrawn sketches in the screen-space, discretizing them into [0,1] space;

S1033: projecting the vertices of the sketches in the screen space to the vertices with the same parameterized values on the crown silhouette line in the screen space, and completing the establishment of the corresponding relationship;

S1034: after the corresponding relationship is obtained, the depth information is added to the vertices of the sketch in the screen space, so that the depth of the vertices of the corresponding object space canopy is obtained, thereby completing the transformation process of the sketch from the screen space to the object space;

S1035: The sketch transformed into the object space is spliced with the unredrawn portion of the crown silhouette line to obtain the complete transformed animation target crown silhouette.

S104: The crown silhouette of the 3D tree model is gradually transformed into the contour of the crown of the transformation animation target, and the transformation of the crown silhouette of the 3D tree model is transmitted to the branches to obtain a smooth transformation process of the tree, as shown in FIG. 2d. The specific steps are as follows:

S1041: After obtaining the silhouette target silhouette of the canopy, the outer leaf cluster is regarded as the surrounding network of the inner leaf cluster according to the hierarchical relationship between the crown and the leaf cluster and the nature of the outer leaf cluster wrapped by the outer leaf cluster and establishing a multi-scale leaf cluster topology tree;

S10422: Detecting the positional relationship between the branches and the target silhouette in the three-dimensional tree model, and appropriately pruning the branches located outside the outline of the transformation target silhouette. Based on the multi-scale leaf cluster topology tree, the pruning process starts from the coarsest scale.

Using the Vatti polygon clipping algorithm, the transformation target crown silhouette line and the original crown silhouette line are intersected, and the ratio of the intersection area to the area of the original canopy outline surrounding area is calculated, denoted as r, based on r, the branches are trimmed by performing the following tests:

S10421: if r is less than 30%, the cluster of leaves surrounded by the reference silhouette is marked as requiring pruning or trimming. Based on the multi-scale leaf cluster topology tree, all inner leaf clusters contained in the leaf cluster are also marked as requiring pruning or trimming to maintain the topological consistency;

S10422: if r is approximate to 1, it means that the reference silhouette of the reference silhouette line surrounding the leaf cluster is almost completely inside the transformation target silhouette, no more pruning tests are required; The branches of the leaf cluster and all the clusters of leaf clusters contained in the leaf cluster do not need to be pruned;

S10423: In other cases, the hierarchical relationship of the multi-scale leaf cluster topology tree is moved down to a finer scale for testing until the innermost leaf cluster is detected or satisfies the conditions of (4.2.1) or (4.2.2);

S10424: The branches surrounded by clusters that are marked as requiring pruning are gradually wilted or disappeared by using the topology-aware method.

S1043: Based on the multiscale leaf cluster topology tree, under a certain selected viewpoint, the silhouette of the outer leaf cluster is regarded as the enclosing polygon of the inner leaf cluster silhouette line. Using this property, the relative positional relationship between the outline of the inner leaf cluster and the silhouette of the outer leaf cluster is represented by the mean coordinate. The expression is:

$$p_i = \sum_{v_j \in C} \omega_{ij} v_j,$$

wherein $p_i$ and $v_j$ are the vertices Cartesian coordinates of the inner and outer cluster silhouettes lines, respectively. $\omega_{ij}$ is the mean-value coordinate, and C is the vertex set of the outer leaf cluster silhouette.

This means that any point within the bounding polygon can be represented as a linear combination of vertices surrounding the polygon. Therefore, under the constraint that the relative positional relationship is constant, when the outline of the outer leaf cluster silhouette is deformed, the silhouette of the inner leaf cluster is quickly updated by the following equation:

$$p'_i = \sum_{v'_j \in C} \omega_{ij} v'_j,$$

wherein $p'_i$ an $dv'_j$ are respectively the vertices Cartesian coordinates of the deformed inner and outer leaf cluster silhouette lines, $\omega_{ij}$ is the mean coordinate, and C represents the vertex set of the outer leaf cluster silhouette.

In order to make the 3D tree model better deformed into the shape of the crown of the transformation animation target, after updating the outline of the inner leaf cluster with the mean coordinates, it is necessary to further adjust its shape so that all the inner leaf clusters in the outer leaf cluster of the silhouette covers the silhouette of the outer leaf cluster as much as possible. The specific steps are as follows:

S10431: segmenting the outline of the outer layer of the leaf cluster according to the coverage of the outline of the outer layer of the leaf cluster;

There are n inner leaf cluster silhouette $S^i = \{s_1^i, s_1^i, \ldots, s_n^i\}$ and the outer leaf cluster silhouette $s^e$ surrounding them. Each element in the $S^i$ collection is locally matched to the screen space by $s^e$, and the portion of the $s^e$ that matches the element in Si is marked as a coverage area and marked as O; the portion of $s^e$ that does not match the element in $S^i$ is marked as an uncovered area and is marked as F, thereby completing the segmentation of the silhouette layer $s^e$ of the outer leaf cluster.

To maximize the coverage, we greedily deform the child cages. For instance, given an F segment with neighboring segments $O_i$ and $O_j$, for every child cage $\{s_k^i | s_k^i \in S^i\}$ that is partially matched to either $O_i$ or $O_j$ within a threshold, we perform Laplacian transformation to adjust the cage with strategically selected constraint points. With the entire child cage $s_k^i$ considered as the region of interest, the vertices of $s_k^i$ that are partially matched to $O_i$ or $O_j$ segments are automatically selected as constraint points. Furthermore, with the mappings induced by the screen-space arc-length parameterization of the child cage and F segment, the cage vertices that are matched with the F segment are also selected as additional constraint points.

S10432: Maximally covering the silhouette of the outer leaf cluster by a greedy algorithm. The process is completed by performing Laplace transformation on the inner leaf cluster silhouette;

The outer leaf cluster silhouette outline $s^e$ for the uncovered F region adjacent to the coverage area $O_i$ and $O_j$ regions on $s^e$, for all inner leaf cluster silhouette that partially match the $o_i$ or $o_j$ regions $\{s_k^i | s_k^i \in s^i\}$, the whole $s_k^i$ is used as the region of interest, and the region matching the F region on $s_k^i$ is used as the constraint point, and Laplacian transformation is performed on $s_k^i$, the specific process is as follows:

Given a leaf cluster silhouette, denoted as S=(V, E), wherein V is the set of vertices on the silhouette of the leaf cluster silhouette and E is the edge between the vertices of the silhouette of the lead cluster silhouette. The differential coordinates of the relative positional relationship between the vertices of the silhouette of the leaf cluster silhouette, that is, the Laplacian coordinates, are expressed as the following equation:

$$\delta_i = v_i - \frac{1}{d_i} \sum_{j \in N(i)} v_j,$$

where $\delta_i$ is the differential coordinate of $v_i$, and N(i) is the set of neighboring vertices of $v_i$ and satisfies:

$$N(v_i) = \{v_j | (v_i, v_j) \in E\}$$

, where $d_i = |N(v_i)|$ denotes the number of neighbor vertices of the vertex. The transformation of the silhouette conforms to the following linear system:

$$\arg\min_{v'_i} \sum_{v'_i \in S} \|L(v'_i) - \delta_i\|^2 + \sum_{v_j \in C} \|v'_j - v_j\|^2,$$

where $L(\cdot)$ is the Laplacian adjacent matrix of the silhouette vertices of the leaf cluster silhouette, $v_j$ is the Cartesian coordinate of the vertex of the silhouette of the outer leaf cluster, $v'_i$, $v'_j$ are the vertices Cartesian coordinates of the silhouette of the outer layer of the leaf cluster after transformation, $\delta_i$ is the differential coordinate of $v_i$, C is the set of outer vertices.

The unique solution is obtained by the least squares method, and the deformed inner layer leaf cluster silhouette is obtained.

After the contour of the crown silhouette changes, according to the mean-value coordinate of the silhouette of the multi-scale leaf cluster topological tree and the inner leaf cluster under the viewpoint relative to the outer leaf cluster, the mean-value coordinate formula is continuously updated. The silhouette of the layer of leaf clusters completes the downward transfer of the silhouette of the leaf cluster silhouette, and the transformation is transmitted to the innermost leaf cluster.

S1044: The three-dimensional model of the leaf cluster is transformed according to the transformed leaf cluster silhouette and transmitted to the branch. The main steps are as follows:

S10441: Calculating the cotangent weight Laplacian operator of the original three-dimensional model of the leaf cluster, establishing a differential coordinate equation, and transforming the vertices on the three-dimensional model of the leaf cluster from the Cartesian coordinate system to the differential coordinates.

According to the three-dimensional tree model, a three-dimensional model of the leaf cluster is given, denoted as M=(V, E, F), wherein V is a set of vertices, E is a set of three-dimensional model edges of the leaf cluster, and F is a set of faces. The Cartesian coordinate of the vertices on the model are expressed as $v_i = (x_i, y_i, z_i)$, and the differential coordinates of the relative positional relationship between the vertices, i.e. Laplacian coordinate can be expressed as:

$$\delta_i = \left(\delta_i^{(x)}, \delta_i^{(y)}, \delta_i^{(z)}\right) = v_i - \sum_{v_j \in N(v_i)} \omega_j v_j,$$

where $\delta_i$ is the differential coordinate of the vertex $v_i$, $\omega_j$ is the cotangent weight, $N(v_i)$ is the set of neighboring vertices of $v_i$ and satisfies $N(v_i)=\{v_j|(v_i, v_j)\in E\}$.

S10442: The vertex of the leaf cluster on the silhouette line under the viewpoint is used as a set of constraint points, and a full rank linear equation system is established together with the new position of the contour vertex after the transformation, and the expression is:

$$\underset{v'_i}{\operatorname{argmin}} \sum_{v'_i \in M} \|L(v'_i) - \delta_i\|^2 + \sum_{v_j \in C} \|v'_j - v_j\|^2,$$

where $\delta_i$ is the differential coordinate of $v_i$, that is, the Laplace coordinate of the cotangent weight, C is the set of the constraint points, $v_j$ and $v'_j$ are the coordinates of the constraint points before and after the transformation, respectively. $v'_j$ is the Cartesian coordinate of the vertex of the leaf cluster model after transformation, and $L(\cdot)$ is the Laplacian adjacency matrix of the vertex of the leaf cluster model, expressed as:

$$L(i, j) = \begin{cases} -\omega_{ij} & (v_i, v_j) \in E \\ 1 & v_i = v_j \\ 0 & \text{otherwise} \end{cases}$$

Since the order of the constrained vertices in the set C does not affect the transformation result, it is assumed that the vertex in the set C is $C=\{v_1, v_2, \ldots v_m\}$, and the deformed vertex Cartesian coordinates are $\{v'_1, v'_2, \ldots v'_m\}$. Therefore, the above-mentioned linear system can be written as:

$$\left(\frac{L}{\omega I_{m \times m} | 0}\right) V = \left(\frac{\delta}{\omega v'_{1:m}}\right),$$

where m is the number of constrained vertices, $\omega$ is the weight of the constrained vertices, $I_{m \times m}$ is the m×m identity matrix, $v'_{1:m}$ is the column vector $(v'_1, v'_2, \ldots v'_m)^T$, L is the Laplacian matrix of the vertex of the leaf cluster model, and $\delta$ is the differential coordinate of $v_i$;

The linear equation system is solved by the least squares method: the coefficient matrix $$\left(\frac{L}{\omega I_{m \times m} | 0}\right)$$

is denoted as A, and $$\left(\frac{\delta}{\omega v'_{1:m}}\right)$$

is denoted as B, the linear system can be written as AV=B, where the solution V can be solved by $V=(A^T A)^{-1} A^T B$. Since the Cartesian coordinate of the surface vertices has three dimensions (x, y, z), three components are solved separately:

$$V^{(x)} = (A^T A)^{-1} A^T B^{(x)}$$

$$V^{(y)} = (A^T A)^{-1} A^T B^{(y)}$$

$$V^{(z)} = (A^T A)^{-1} A^T B^{(z)}$$

and obtaining a new leaf cluster model conforming to the silhouette of the deformation after the viewpoint.

For all the transformed inner leaf cluster silhouette s, the above algorithm is used to solve the transformed leaf cluster model, thereby realizing the transformation from the leaf cluster silhouette to the leaf cluster three-dimensional model.

S10443: Since the innermost leaf cluster grows directly on the top of the shoot, it is considered to be the bounding grid at the end of the shoot. Whenever the innermost leaf cluster is transformed, the new position of the end of the branch after transformation can be quickly calculated by the mean value coordinate of the end of the branch relative to the innermost leaf cluster. The expression is:

$$p' = \sum_{v'_j \in M} \omega_j v'_j,$$

where p' and $v'_j$ are the apex of the deformed end of the branch and the apex of the innermost leaf cluster model M, respectively, and $\omega_j$ is the mean-value coordinate.

S10444: Solving the cotangent weight Laplacian operator of the three-dimensional model of the branch, establishing a differential coordinate equation, and taking the root end of the branch as a fixed point, taking the new position of the end of the branch obtained in step S10443 as a moving constraint point, establishing a linear equation system in step S10442, and solving the deformed branches by using the least-squares method.

S10445: Because of the hierarchical relationships of the tree branches, when the parental branches are transformed, the child branches will also undergo transformation accordingly, and the transformation process is consistent with the process described in step S10444.

Figure 4:
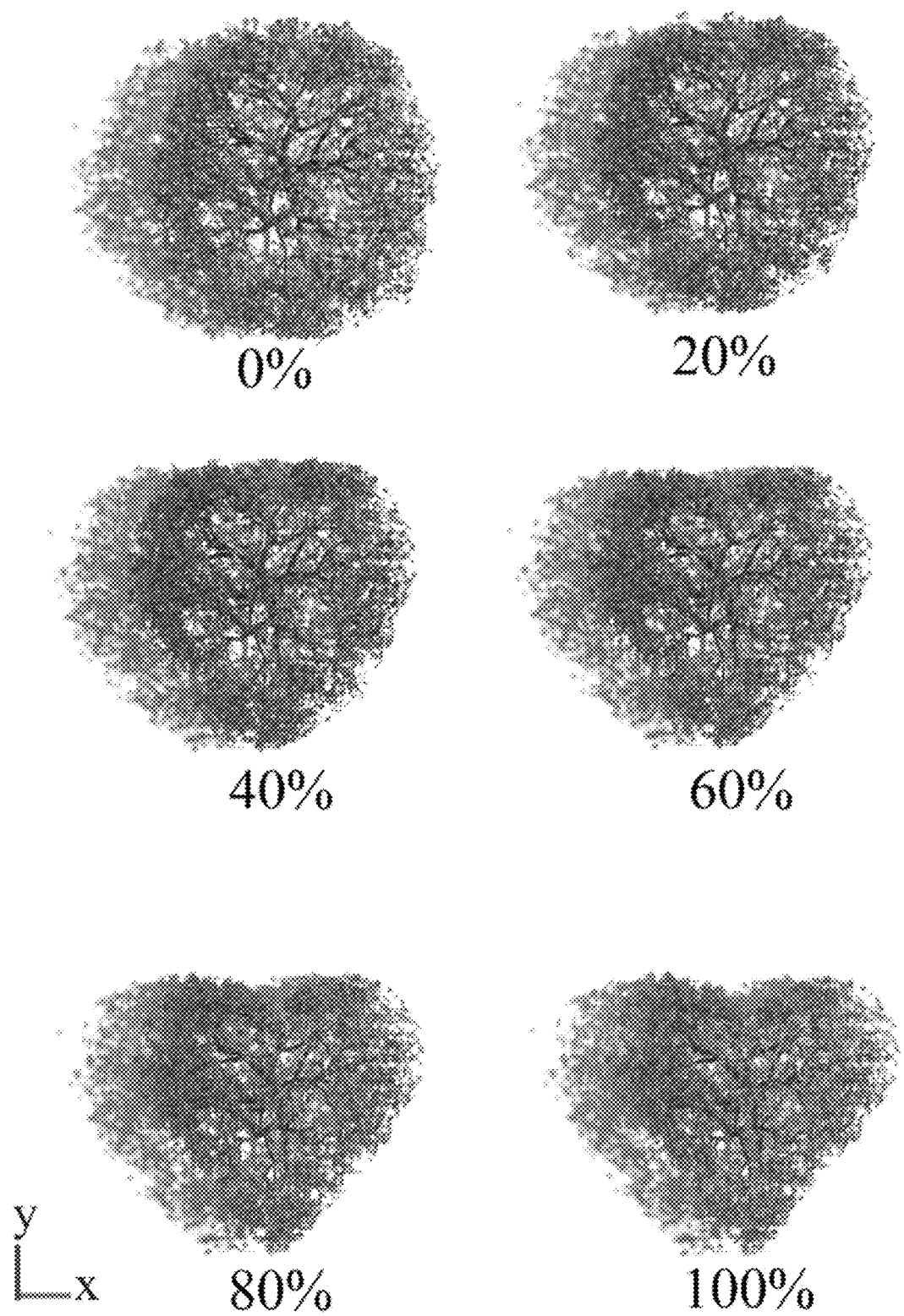
FIG. 4 is an example of the shape-preserving animation generated by the present invention.

S105: keeping record of the transformations of the tree branches in step S1044 on a frame-by-frame basis, and obtaining a tree transformation animation of the shape preservation, as shown in FIG. 4.

The invention claimed is:

1. A sketch-based shape-preserving tree animation method, which comprises the following steps:
   (1) creating a three-dimensional tree model;
   (2) representing the three-dimensional tree model in a form of a skeleton and a cluster of leaves, which is achieved in the following steps:
   (2.1) separating leaves and trunks of the three-dimensional tree model, including a trunk portion and branch portions of the tree;
   (2.2) extracting the skeleton of tree branches of the three-dimensional tree model;
   (2.3) determining a crown portion of the three-dimensional tree model based on human visual perception of the trunk structure and an overall shape of the canopy, splitting the crown into several outer contours composed of leaves, represented by clusters of leaves, and using mean coordinates to indicate relative positional relationship between silhouette of inner leaf clusters and the contour of outer leaf clusters;
   (3) selecting an angle of interest, detecting crown silhouette of the three-dimensional tree model described in step (2), drawing a silhouette of transformed animation target crown based on a sketch, and then mapping the sketch to a crown silhouette line of an object space;

(4) gradually transforming the crown silhouette of the three-dimensional tree model into the contour of the crown of a transformation animation target, and transmitting the transformed crown silhouette of the three-dimensional tree model to the branches to obtain a smooth transformation process of the tree; and (5) recording frame by frame of the tree transformation process in the step (4) to obtain a shape transformation tree transformation animation.

2. The sketch-based shape-preserving tree animation according to claim 1, the three-dimensional models in step (1) are generated by using one of the following methods: point-based three-dimensional real-world tree recovery, computer synthesized virtual trees based on an L system, and the three-dimensional trees hand modeled by users using three-dimensional modeling tools.

3. The sketch-based shape-preserving tree animation according to claim 1, wherein the skeletons of the tree branches in step (2.2) are extracted by using a Laplacian mesh contraction algorithm, vertices of the model of the three-dimensional trunk are contracted in opposite direction of a normal line, since the trunk has characteristics of a cylinder, vertices on a cross section of the trunk converge into a skeleton point, and the skeleton points are connected according to a topological structure of the trunk to obtain the skeleton of the trunk.

4. The sketch-based shape-preserving tree animation according to claim 1, the skeleton extracted by the Laplacian mesh contraction algorithm in step (2.2) is restored to a three-dimensional model of the trunk using a sphere.

5. The sketch-based shape-preserving tree animation according to claim 1, wherein, in step (3), the object space silhouette of the three-dimensional tree model is detected, and the object space silhouette is formed by a series of edges on the three-dimensional tree model, and the vertex normal vectors $n_i$ and $n_j$ and view direction v satisfy $(n_i \cdot v)*(n_j \cdot v)=0$.

6. The sketch-based shape-preserving tree animation according to claim 1, wherein, in step (3), the method to draw the silhouette of the transformed animation target crown based on the sketch is as follows: a region of interest on the crown silhouette is redrawn, and the shape of an existing canopy is modified as a sketch; a new sketch is redrawn as the silhouette of the transformed animation target crown.

7. The sketch-based shape-preserving tree animation according to claim 1, wherein, in step (4), the transformation of the crown's silhouette is transmitted to the tree branches based on a multiscale leaf cluster topology and a Laplacian transformation algorithm, which is achieved in the following substeps:

(4.1) regarding an outer leaf cluster as a surrounding grid of an inner leaf cluster, and establishing a multi-scale leaf cluster topology tree;

(4.2) updating the silhouette of the inner leaf cluster according to the mean value coordinate of an inner leaf cluster silhouette line relative to an outer leaf cluster silhouette, and continuously updating the silhouette of the inner leaf cluster according to the multi-scale leaf cluster topology tree silhouette, and the transformation of the outer canopy silhouette is gradually transferred from outer and inner layers of the multi-scale leaf cluster topology tree to an innermost finest-scale leaf cluster;

(4.3) transforming the three-dimensional model of the leaf cluster and transmitting the transformed model to the branches according to the silhouette of the leaf cluster silhouette.

8. The sketch-based shape-preserving tree animation according to claim 7, characterized in that:

in the step (4.1), after establishing the multi-scale leaf cluster topology tree, pruning the branches outside an outline of the crown of the transformation animation target;

in the step (4.2), transferring the transformation of an outline of the outer leaf cluster to the silhouette of the inner leaf cluster, and adjusting the silhouette of the inner leaf cluster in the process to cover the outer leaf cluster silhouette as much as possible.

9. The sketch-based shape-preserving tree animation according to claim 8, characterized in that, in the step (4.1), the branches outside the outline of the crown of the deformation animation target are trimmed, and a Vatti polygon clipping algorithm is used to intersect a contour of a transformation target crown silhouette and an original crown silhouette, and an intersection area is calculated; a ratio of an area surrounding an outline of an original canopy silhouette is recorded as r, and whether the leaf cluster is trimmed is judged based on r, and the branches determined to be trimmed and surrounded by a trimmed leaf cluster gradually disappear in the transformation animation, and a transformation result is obtained;

in the step (4.2), after the outline of outer leaf cluster silhouette is transformed, an inner layer leaf cluster silhouette is updated with respect to mean-value coordinate of an outer leaf cluster silhouette line to update Cartesian coordinates of an inner leaf cluster silhouette vertex, then continue to transform the inner leaf clusters using the following equation to cover outer leaf cluster silhouette:

$$\underset{v'_i}{\operatorname{argmin}} \sum_{v'_i \in S} \|L(v'_i) - \delta_1\|^2 + \sum_{v_j \in C} \|v'_j - v_j\|^2,$$

where $S=(V, E)$ is the inner silhouette, V being the set of vertices and E being the set of edges, $v_i$ and $v_i'$ are the Cartesian coordinates of the silhouette vertices on an outline of the leaf cluster before and after the transformation, respectively; $d_i$ is differential coordinates of $v_i$, C is a set of vertices that are locally matched to the silhouette of the leaf cluster and outer silhouette, and $v_j$ and $v_j'$ are the Cartesian coordinates of the vertices of the silhouette of the inner layer of the leaf cluster before and after the transformation of the set C, respectively.

10. The sketch-based shape-preserving tree animation according to claim 8, the step (4.3) is achieved as follows:

(4.3.1) computing a Laplacian operator of the leaf cluster in the step (2) and establishing a differential coordinate equation to transforming the vertices of the leaf clusters in the three-dimensional tree model from a Cartesian coordinate system to a differential coordinate space;

(4.3.2) using the vertices on the silhouette line of the leaf cluster at the selected angle of view in the step (3) as a set of constraint points, and establishing a full rank linear equation system together with the new position of the vertices of the contour after transformation:

according to the three-dimensional tree model, a three-dimensional model of the leaf cluster is given, denoted as $M=(V, E, F)$, where V is the set of vertices, E is the set of model edges, and F is the set of faces, then a system expression of the full rank linear equation is as follows:

$$\sum_{v'_i \in M} \|L(v'_i) - \delta_i\|^2 + \sum_{v_j \in C} \|v'_j - v_j\|^2,$$

where $L(\cdot)$ is a Laplacian adjacency matrix of a vertex of a leaf cluster model, $v_1$ is the vertex of the silhouette of outer layer of the leaf cluster, and $v'_j$ is the vertex of the outline of outer layer of the transformed leaf cluster, $v'_i$ is the vertex of the three-dimensional model of the leaf cluster after deformation, and a differential coordinate of $v_i$ is $\delta_i$, C represents a collection of outer vertices;

the three-dimensional model of the new leaf cluster conforming to the contour of the leaf cluster after transformation in the selected angle of view in the step (3) is obtained by least square method;

(4.3.3) an innermost leaf cluster is regarded as a surrounding mesh of an end of the branch; due to the deformation of the crown, new position of the end of the branch after transformation is calculated by the mean-value coordinate of the end of the branch relative to the innermost leaf cluster;

(4.3.4) calculating a cotangent weight Laplacian operator of the branches in the three-dimensional tree model, establishing the differential coordinate equation, and using an end point of the branch as a fixed point, taking the new position of the end of the branch obtained in the step (4.3.3) as a moving constraint point, the full rank linear equation system of the step (4.3.2) is established, and the transformed branches are obtained.

11. The sketch-based shape-preserving tree animation according to claim 7, the step (4.3) is achieved as follows:

(4.3.1) computing a Laplacian operator of the leaf cluster in the step (2) and establishing a differential coordinate equation to transforming the vertices of the leaf clusters in the three-dimensional tree model from a Cartesian coordinate system to a differential coordinate space;

(4.3.2) using the vertices on the silhouette line of the leaf cluster at the selected angle of view in the step (3) as a set of constraint points, and establishing a full rank linear equation system together with new position of the vertices of the contour after transformation:

according to the three-dimensional tree model, a three-dimensional model of the leaf cluster is given, denoted as M=(V, E, F), where V is the set of vertices, E is the set of model edges, and F is the set of faces, then a system expression of the full rank linear equation is as follows:

$$\sum_{v'_i \in M} \|L(v'_i) - \delta_i\|^2 + \sum_{v_j \in C} \|v'_j - v_j\|^2,$$

where $L(\cdot)$ is a Laplacian adjacency matrix of a vertex of a leaf cluster model, $v_j$ is the vertex of the silhouette of outer layer of the leaf cluster, and $v'_j$ is the vertex of the outline of outer layer of the transformed leaf cluster, $v'_i$ is the vertex of the three-dimensional model of the leaf cluster after deformation, and a differential coordinate of $v_i$ is $\delta_i$, C represents a collection of outer vertices;

the three-dimensional model of a new leaf cluster conforming to the contour of the leaf cluster after transformation in the selected angle of view in the step (3) is obtained by least square method;

(4.3.3) an innermost leaf cluster is regarded as a surrounding mesh of an end of the branch; due to the deformation of the crown, new position of the end of the branch after transformation is calculated by mean-value coordinate of the end of the branch relative to the innermost leaf cluster;

(4.3.4) calculating a cotangent weight Laplacian operator of the branches in the three-dimensional tree model, establishing the differential coordinate equation, and using an end point of the branch as a fixed point, taking the new position of the end of the branch obtained in the step (4.3.3) as a moving constraint point, the full rank linear equation system of the step (4.3.2) is established, and the transformed branches are obtained.

* * * * *